(12) United States Patent
Ebinger

(10) Patent No.: US 6,293,586 B1
(45) Date of Patent: Sep. 25, 2001

(54) MOBILE WORKING MACHINE WITH SUPPORT LEGS AND AXLE BLOCKING SYSTEM

(75) Inventor: Willi Ebinger, Steinenbronn (DE)

(73) Assignee: Putzmeister Aktiengesellschaft (DE)

( * ) Notice: Subject to any disclaimer, the term of this patent is extended or adjusted under 35 U.S.C. 154(b) by 0 days.

(21) Appl. No.: 09/446,528

(22) PCT Filed: Dec. 11, 1998

(86) PCT No.: PCT/EP98/08095

§ 371 Date: Dec. 23, 1999

§ 102(e) Date: Dec. 23, 1999

(87) PCT Pub. No.: WO99/41184

PCT Pub. Date: Aug. 19, 1999

(30) Foreign Application Priority Data

Feb. 12, 1998 (DE) ................................ 198 05 359

(51) Int. Cl.[7] ........................................ B60S 9/99
(52) U.S. Cl. ................... 280/763.1; 280/764.1; 280/766.1; 212/302
(58) Field of Search ............. 280/763.1, 764.1, 280/766.1; 212/302

(56) References Cited

U.S. PATENT DOCUMENTS

| 3,780,891 | * | 12/1973 | Steiner | 280/766.1 |
|---|---|---|---|---|
| 3,781,035 | * | 12/1973 | Petersson et al. | 280/766.1 |
| 3,825,280 | * | 7/1974 | Myers | 280/766.1 |
| 3,871,685 | * | 3/1975 | Senelet | 280/766.1 |
| 4,444,416 | * | 4/1984 | Soderstrom | 280/763.1 |
| 4,466,637 | * | 8/1984 | Nelson | 280/766.1 |
| 4,583,760 | * | 4/1986 | Halstensgaard et al. | 280/766.1 |
| 5,387,071 | * | 2/1995 | Pinkston | 414/563 |
| 5,575,493 | * | 11/1996 | Schwartz et al. | 280/764.1 |
| 5,961,145 | * | 10/1999 | Schillinger et al. | 280/764.1 |

\* cited by examiner

*Primary Examiner*—J. J. Swann
*Assistant Examiner*—L. Lum
(74) *Attorney, Agent, or Firm*—Pendorf & Cutliff

(57) ABSTRACT

The mobile working machine has a chassis (10) comprising at least four wheels (30) arranged in pair-wise associated with wheel axles (32) and connected to a frame (36) by interposed wheel springs (34) pre-tensionable by the effect of a load exerted on the frame. Two support legs (22) are also provided laterally one opposite the other on the sides of the frame, associated with one of the wheel axles (32), preferably the back axle, which have a foot-part (26) which can be extended downward and supported on the ground thereby lifting the chassis. At least one blocking mechanism is also provided to selectively release or block the spring path of one of the wheel springs (34). In order to ensure reliable and safe manipulation during blocking of the axle, the blocking mechanism (38) automatically moves in the blocking direction when the foot-part (26) is pulled out and automatically moves in the release direction when the foot-part (26) is retracted.

20 Claims, 5 Drawing Sheets

MOBILE WORKING MACHINE WITH SUPPORT LEGS AND AXLE BLOCKING SYSTEM

BACKGROUND OF THE INVENTION

1. Field of the Invention

The invention concerns a mobile working machine having a chassis supporting the working machine, at least four wheels pair-wise associated with wheel axles and connected to a frame by interposed wheel springs pre-tensionable by the effect of the load exerted on the axle, with two support legs provided laterally one opposite the other on the sides of the frame and associated with one of the wheel axles, preferably the back axle, which have a foot apart which can be extended downwardly and supported on the ground with raising of the chassis off the ground, and at least one blocking mechanism able to selectively release or block the spring path of one of the wheel springs.

2. Description of the Related Art

Mobile working machines, such as cement pump trucks, must be set up stably on the ground at the work site. For this, they are provided with support legs in the area of the front and/or rear axles. Conventionally, prior to the supporting process, the rear axle is so blocked or arrested on the frame of the vehicle chassis, that during the subsequent extension of the foot parts, they do not have any spring action or only slight spring action and the wheels are lifted off of the ground. For this a blocking mechanism is provided, which selectively blocks or releases the spring path of the wheel springs. The arresting of the axle in a case of mobile cement pump trucks is necessary, in order to increase the stability of the vehicle during pivoting out of the distribution mast. The raised rear axle serves at this time as ballast and contributes to the improved stability of the stance. Besides this, in the case of cement pump trucks with rear material receiving containers there is a reduction of the fill height, which is an advantage during filling with cement.

The most commonly employed technique for spring blocking in the case of cement pumpers involves chains, which prior to the bracing are hooked into a hook provided fixed to the frame. It has already been proposed to carry out the bracing process with the aide of a manually operated hydraulic cylinder. For avoiding the danger of an accident and damage, the axle arresting means must again be released after termination of the work process.

SUMMARY OF THE INVENTION

Beginning therewith, the invention is concerned with the task of improving the known mobile working machine of the above-described type in such a manner, that with little construction expenditure a reliable operation of axle arresting is made possible.

The inventive solution is based on the idea, that the operation of arresting the axle can be simplified or facilitated, when an automatic axle arresting occurs during the bracing process. In order to achieve this, it is proposed in accordance with the invention that, during extension of the foot part, a blocking device is automatically moved in the blocking direction and, during retraction of the foot part, is automatically moved in the release direction. Therein the blocking mechanism is directly or indirectly controlled via the foot part or the control mechanism which operates the foot part.

A preferred design of the invention envisions, that the blocking mechanism is slideable or pivotable between a release and a blocking position relative to a position fixed on the frame directly or indirectly under the influence of the foot part, and which can be arrested relative to the frame at least in the blocking position. Further, the blocking mechanism preferably includes an at least partially flexible or bendable tension member, which on its one end is anchored or connected to the blocking device and on its other end is connected to either the frame or on a frame supporting part of the wheel spring, wherein in the former case supplementally on a wheel supporting side of the spring a direction-changing linkage is provided fixed on the spring, and in the latter case a frame fixed direction changing linkage for the tension member is provided. When the blocking device is in the blocking position, the tension member limits the spring path of the pre-tensioned wheel spring, while in the released position of the blocking device it gives way to the spring path of the wheel spring.

In order to take up the forces acting on the tension member during the blocking of the axle, it is advantageous, when the tension member is guided by at least one further frame-fixed redirection guide. In order to achieve a controllable positioning of the tension member in the released position, it is proposed in accordance with a further preferred embodiment of the invention, that a flexible segment of the tension member is bridged over by a draw-spring which takes up play. Therein the tension member or segment thereof can be formed at least partially as a flexible draw rope or as a chain.

A further preferred embodiment of the invention envisions that the blocking device is constructed as a pivot lock, pivotable between a releasing position and a blocking position, provided fixed on the frame or on a frame fixed part of the support leg, connected with the tension member and pivotable between the blocking position and releasing position via a controlling device associated with the extendable foot part. The pivot lock therefore is preferably pivotable in the direction of the blocking position against the force of a spring engaging on the tension member. The control device preferably includes a control curve slideable against a knuckle provided on the slide lock eccentric to the pivot axis thereof and a blocking surface which arrests the pivot lock in its blocking position. The blocking surface preferably engages on the control curve, so that the knuckle or cam in the blocking position of the pivot lock runs upon the blocking surface, wherein the blocking surface is directed partially in the extension direction of the support foot. It is advantageous, when the pivot lock is pivoted 90° between the release position and the blocking position about its axis, and thereby takes along the tension member. The inventive control device and the pivot lock ensure therefore, that for blocking and for releasing the wheel axle only a relatively short part of the displacement length or stroke of the foot part is necessary, so that the predominant portion of the support movement occurs while the wheel axle is arrested. The steeper the control curve is in the extension of the foot part, so much the shorter is the path of travel required of the foot part for arresting process. In order to reduce the friction during the position changing process, it is preferred that the cam is a roller cam.

When the wheel spring is constructed as a leaf spring, on which the wheel supports are secured via spring stirrups or U-clamps, it is of advantage, when the spring fixed transmission linkage or the spring fixed anchoring position of the tension member is provided on a plate fixed to the spring clamp. When in contrast the wheel spring is designed as a pneumatic spring with variable air pressure, it is of advantage, when the air pressure in the air spring during extension of the foot part is automatically reduced, preferably to atmospheric pressure, and that during retraction of the foot part the air pressure is increased via a pressurized air supply unit. For this purpose there is advantageously envisioned a reversing process, which is controlled directly or indirectly via the foot part or the blocking mechanism, and thereby acts upon the air spring selectively with air pressure or with atmospheric pressure.

BRIEF DESCRIPTION OF THE DRAWINGS

In the following, the invention will be described on the basis of the illustrative embodiment shown in schematic manner in the drawings.

There is shown.

DETAILED DESCRIPTION OF THE INVENTION

Figure 1A:
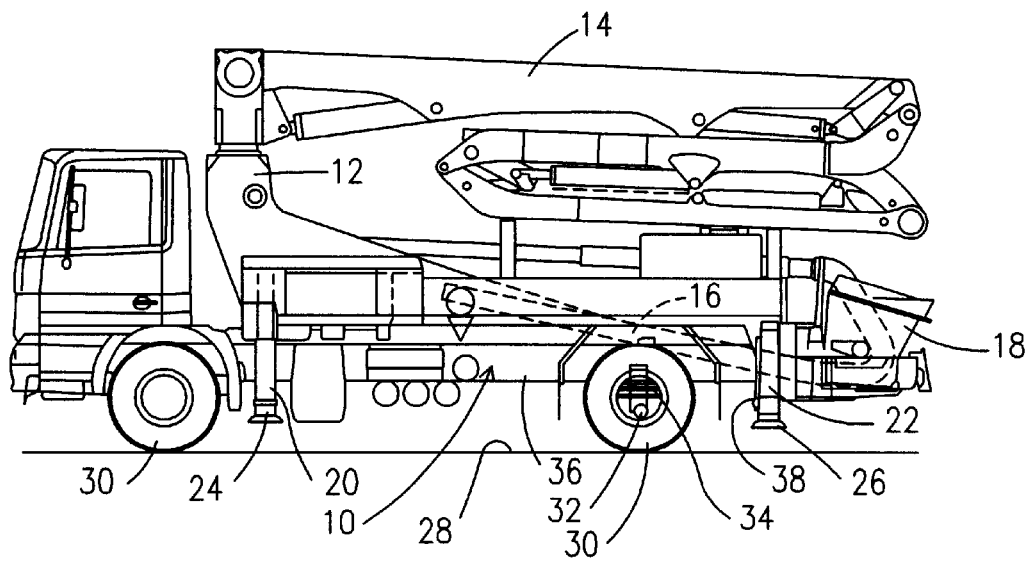
FIGS. 1a–b A side view of a mobile cement pump in driving position and in raised pump position, FIGS. 2a–c A side view, a top view, and an end view of a blocking mechanism for the arresting of the axle.
Figure 1B:
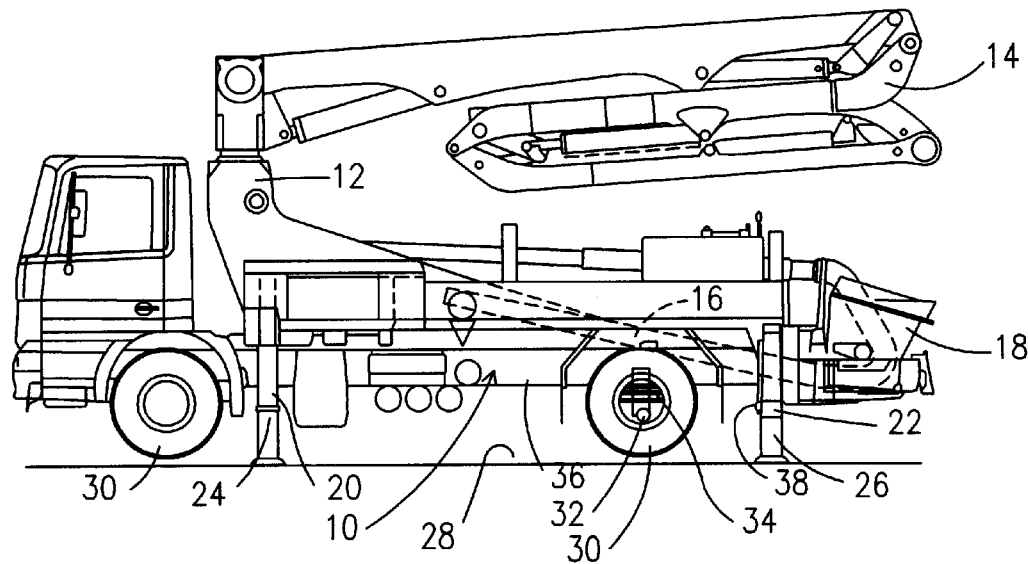

The mobile cement pump shown in FIG. 1a in the driving position and in FIG. 1b in the raised pumping position is essentially comprised of a two-axle chassis 10, a cement distribution mast mounted pivotably about a vertical axis along a mast stand 12 in the vicinity of the forward axle, a viscous fluid pump 16 with material receiving container 18 and a support construction comprised of two forward and two rearward support legs 20, 22. The support legs 20, 22 are respectively provided with one foot part 24, 26 which is extendable downwardly and supportable upon the ground 28 with raising of the chassis 10. As can be seen by FIGS. 1a and b, the wheels of the rear axle 32 are supported on the frame 36 of the vehicle chassis 10 via intermediate wheel springs 34 pretensionable under the action of the axle load. The wheels 34 are in the shown illustrative embodiment formed as layered leaf springs. Each wheel of the rear axis 32 is besides this provided with a blocking mechanism 38, with which the spring path of the respective wheel springs 34 prior to lifting into the pump position according to FIG. 1b are blocked and thereby the rear axle 32 is arrested against the frame 36.

As will be discussed in greater detail below, the blocking mechanism is so linked or coupled to the operation of the foot part 26, that during the extension of the foot part the blocking mechanism is automatically in the blocking position and during retraction of the foot part it is automatically brought into the release position.

The blocking mechanism 38 for this purpose exhibits, as blocking device of the pivot lock design, a blocking device 42 which is pivotable to a frame fixed rotation 40 under the influence of the foot part 26 between a release position and a blocking position, which can be arrested in the blocking position in a position fixed relative to the frame, as well as a tension member 44 anchored on its one end to the blocking device 42, which in the blocking position of the blocking device 42 borders or limits the spring path of the pretensioned wheel spring 34 and in the release position of the blocking device 42 allows for play in the spring path of the wheel spring. In the illustrative embodiment shown in FIGS. 2a–c, the tension member 44 is designed as a flexible tension member, which from the blocking device 42 over to frame fixed redirection guides 46, 48 is directed to a spring clamp plate 50 and there is anchored in an anchoring position 52. The spring clamp plate 50 is fixedly connected with the spring clamp 54, with which the leaf springs are held on the wheel axle 32 or, as the case may be, on the wheel bearings or supports 56. The leaf springs are for their part hung or mounted at their ends on the frame via not shown spring anchors.

Figure 2A:
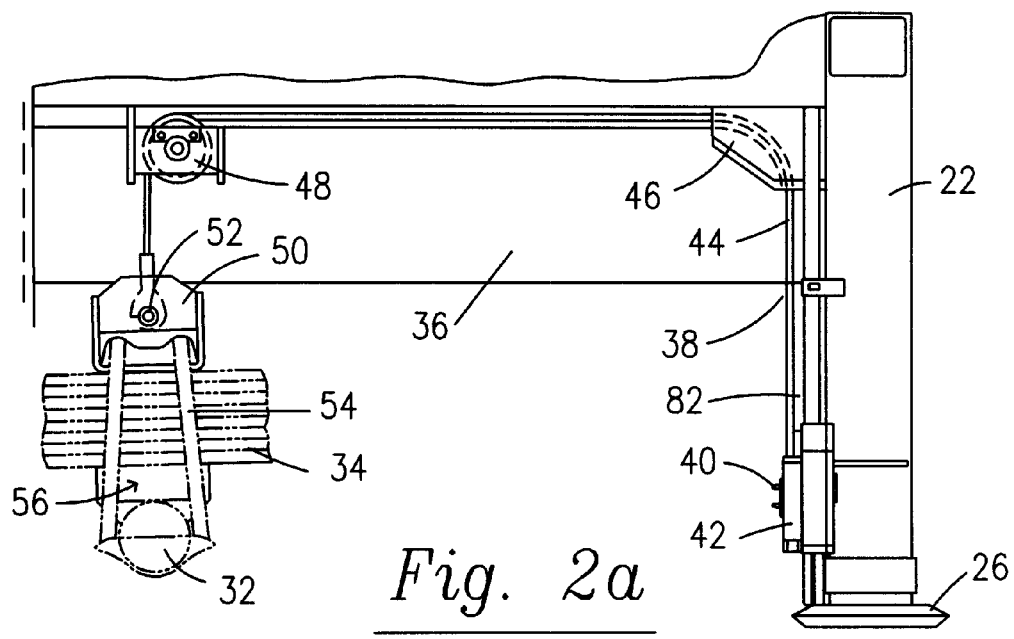
Figure 2B:
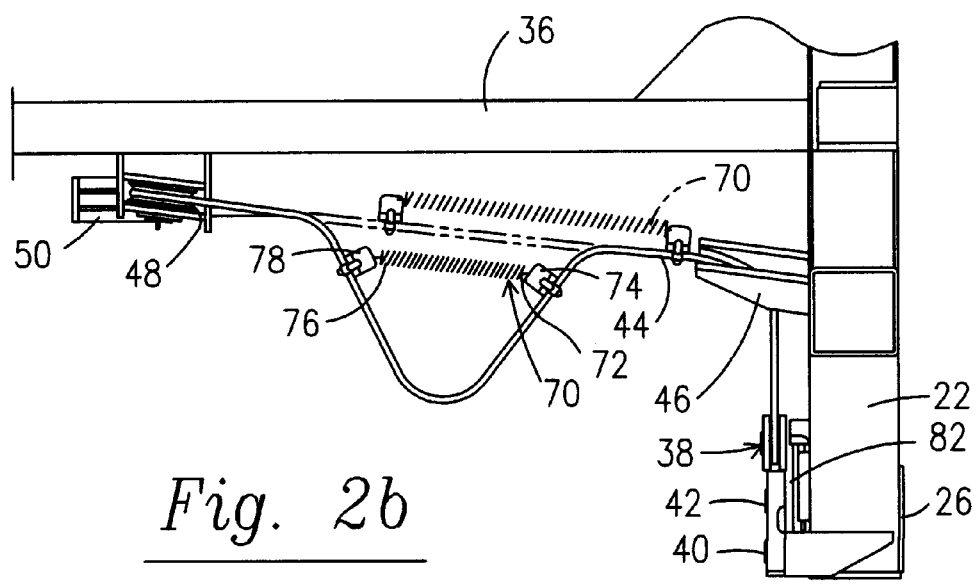
Figure 2C:
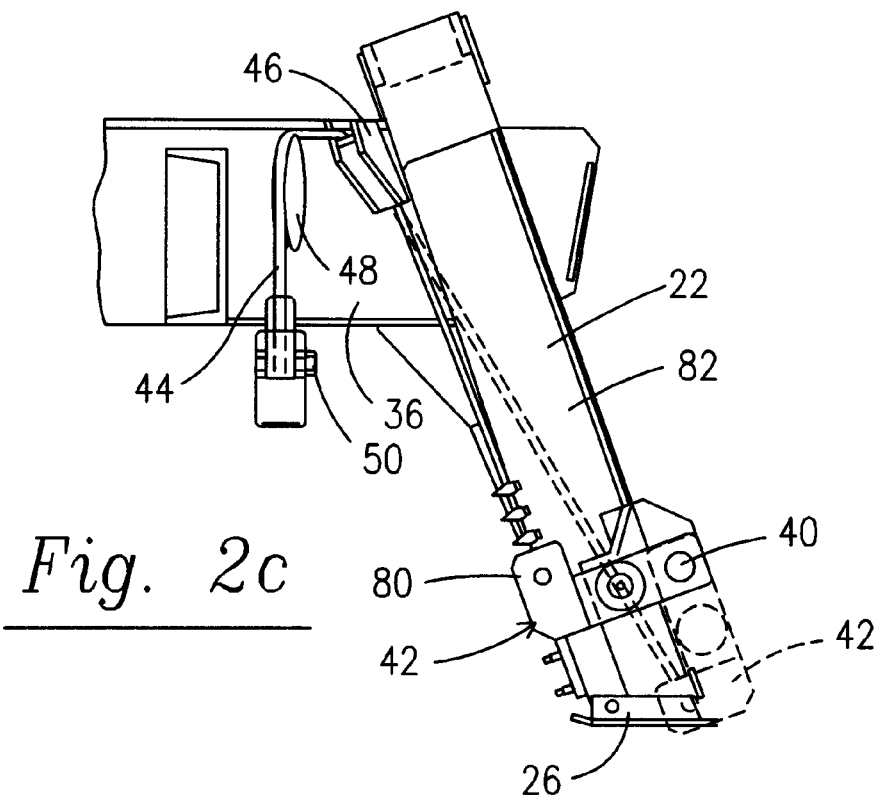
Figure 3C:
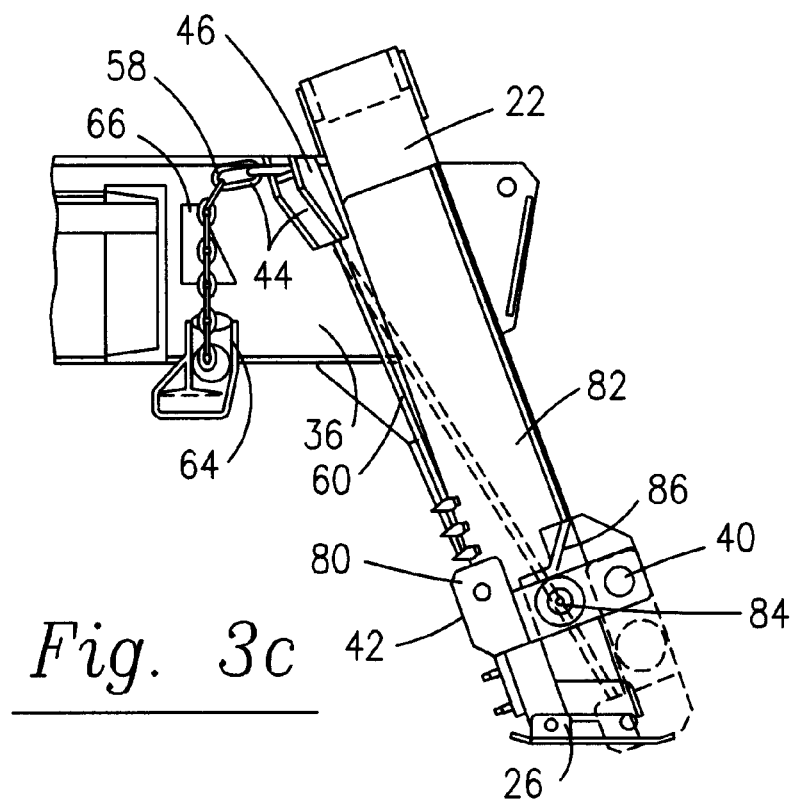
FIGS. 3a, b, and c A side view, a top view, and an end view of a blocking mechanism which is different from that shown in FIGS. 2a–c.
Figure 3A:
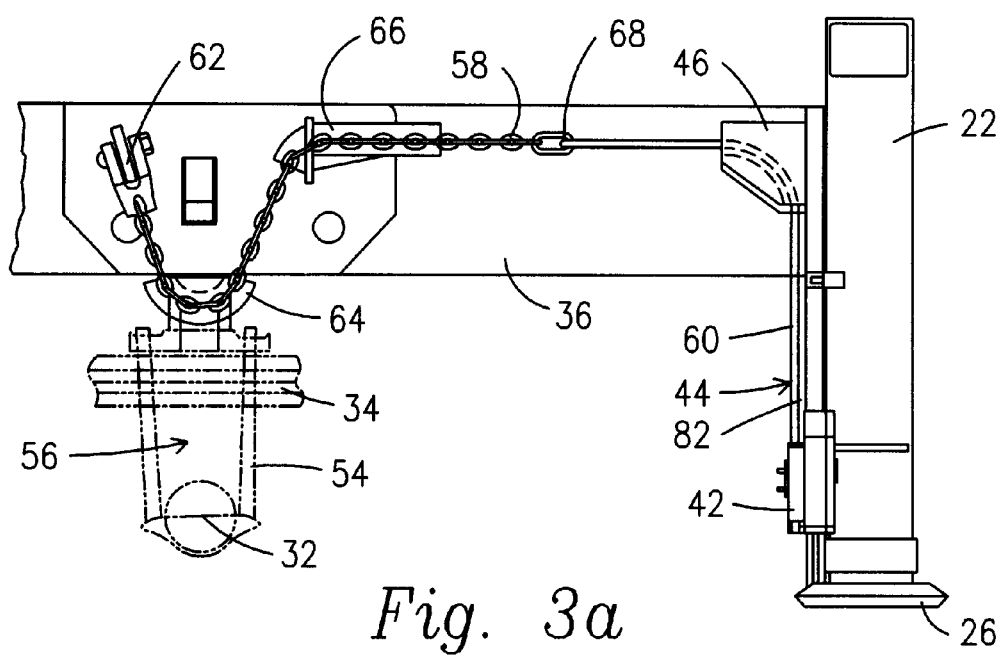
Figure 3B:
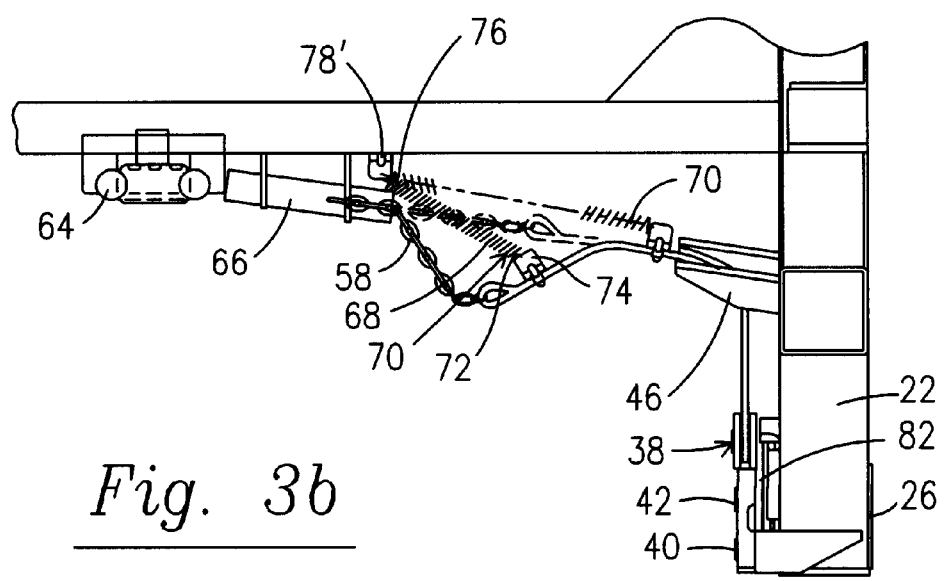

The illustrative embodiment shown in FIGS. 3a–c differs from the illustrative embodiment according to FIGS. 2a–c therein, that the tension member 44 is comprised of a chain segment 58 and a rope segment 60, whereby the chain segment 58 is anchored with its free end on a frame fixed anchoring position 62 and via a curved redirection guide 64 provided on the spring U-clamp plate 50 is guided through to a frame fixed redirection guide 66. In the area between the frame fixed redirection guides 66 and 46, there is to be found a connecting position 68, at which the chain segment 58 is connected with the rope segment 60.

In the intermediate area between the two redirection guides 46, 48, or as the case may be 46, 66 the tension member 44 is bridged over by a draw spring 70 which with one end 72, in both cases via a spring holder 74, is connected with the tension member 44, while with its other end 76 in the case of FIG. 2b, is secured via a further spring holder 78 to the tension member 44, and in the case of FIG. 3b via a spring holder 78' is connected to the frame 36. The pull spring 70 ensures that in the release position of the blocking device 42 the tension member 44 is maintained under a certain pretension both in the direction of the blocking device 42 as well also in the direction of the wheel spring 34.

Figure 4:
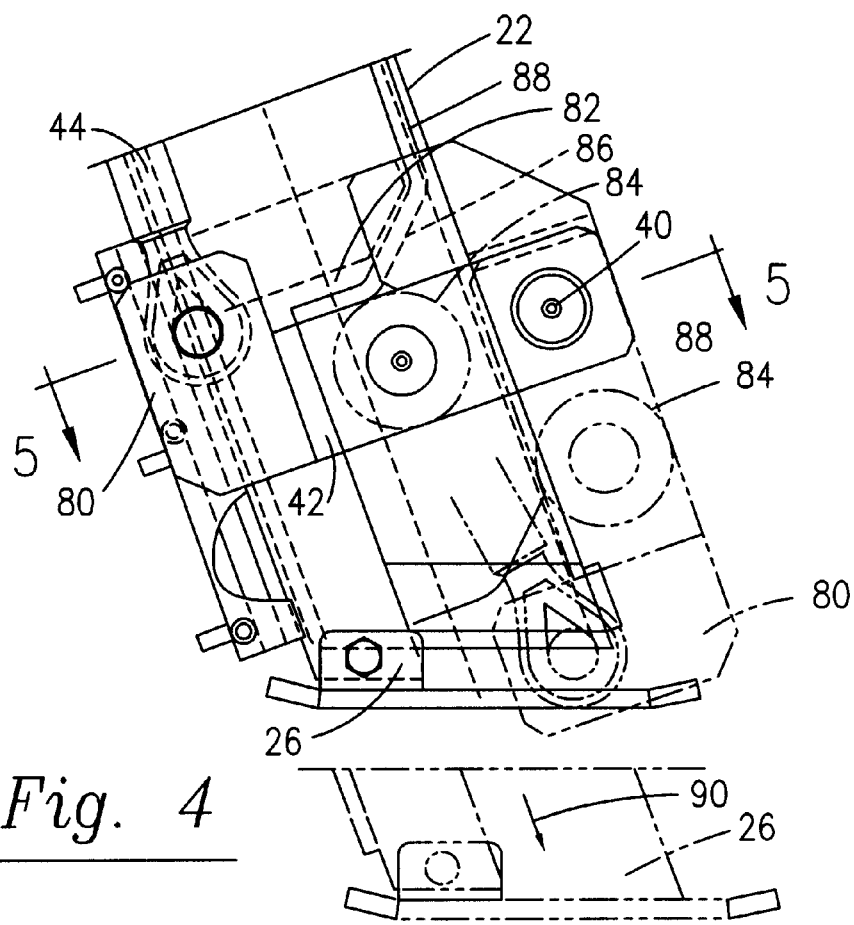
FIG. 4 An enlarged section of FIG. 2c & FIG. 3c.
Figure 5:
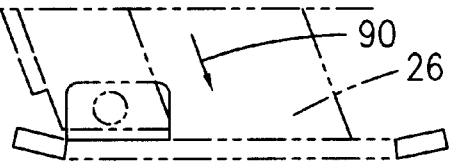
FIG. 5 A section along the section line 5—5 of FIG. 4.
Figure 5:
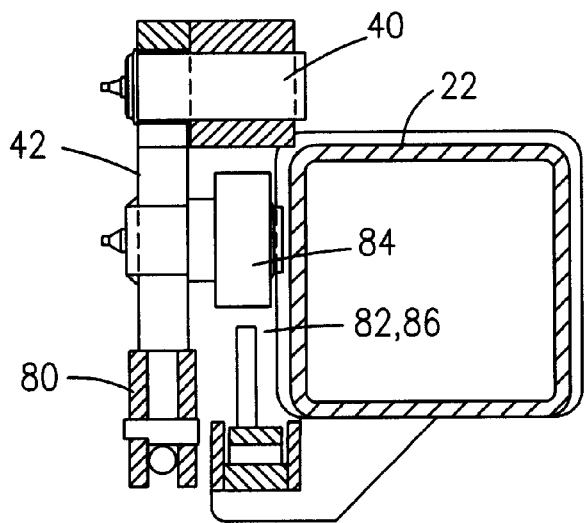

As can be seen in particular from FIG. 4 and 5, the blocking device 42 is designed as a pivot lock linked in the area of the rotation axis 40 to a frame fixed part of the support leg 22, which on it's end 80 opposite to the rotation axis is a pivot lock connected to the tension member, which is pivotable via a control mechanism 82 rigidly provided on the extendable foot part 26, for pivoting between a release position indicated in solid line and a blocking position indicated in dashed line, against the force of a pull spring 70 engaging the tension member 44. The control mechanism 82 comprises for this purpose a control curve or lobe 86 for displacing a roller cam 84 provided on the blocking device 42 eccentric to the rotation axis thereof, and a blocking surface 88 connected to or continuous with the control curve or lobe 86, the blocking surface arresting the control device 82 in its blocking position. During pivoting out to the blocking position, the roller cam 84 of the blocking device 42 runs along the blocking surface 88 of the control device 82. The blocking surface 88 is thereby oriented parallel to the extension direction of the foot part shown by arrow 90 in FIG. 4 so that for the blocking action, it does not depend upon how far the foot part 26 is extended out of the fixed part of the support leg 22. Going from the release position to the blocking position, the blocking device 42 is pivoted 900 about its pivot axis 40, whereby to achieve this full pivoting only a relatively short displacement path of the foot part 26 in the direction of the arrow 90 is necessary.

During the retraction of the foot part 26, the blocking device 42 in the last phase of the retraction process runs along the blocking surface 88 and then the control curve 86 and is there, under the action of the pull spring 70, pivoted back to its release position.

In summary, the following is to be concluded:

The mobile working machine has a chassis 10 comprising at least four wheels 30 arranged in pair-wise associated with wheel axles 32 and connected to a frame 36 by interposed wheel springs 34 pre-tensionable by the effect of a load exerted on the frame. Two support legs 22 are also provided laterally one opposite the other on the sides of the frame, associated with one of the wheel axles 32, preferably the back axle, which have a foot-part 26 which can be extended downward and supported on the ground thereby lifting the chassis. At least one blocking mechanism is also provided to selectively release or block the spring path of one of the wheel springs 34. In order to ensure reliable and safe manipulation during blocking of the axle, the blocking mechanism 38 automatically moves in the blocking direction when the foot-part 26 is pulled out and automatically moves in the release direction when the foot-part 26 is retracted.

What is claimed is:

1. Mobile working machine with:
    a chassis including a frame supporting a work machine and at least four wheels pair-wise associated with wheel axles and connected to said frame via wheel springs, said wheel springs pre-tensioned by a load exerted on the axles by the chassis and work machine,
    two support legs provided laterally one opposite the other on opposite sides of the frame and associated with one wheel axle, each of which support legs having a foot part that can be extended downwardly and supported on the ground thereby raising the chassis off the ground, and
    at least one blocking mechanism moveable between a releasing position and a blocking position for selectively releasing or blocking the spring path of one of the wheel springs,
    wherein the blocking mechanism is operably associated with the foot part such that it automatically moves into the blocking position when the foot part is extended and automatically moves into the release position when the foot part is retracted.

2. Mobile working machine according to claim 1, wherein the blocking mechanism is operatively associated with one or the other of (a) the foot part and (b) a mechanism which operates the extension and retraction of the foot part.

3. Mobile working machine according to claim 1, wherein the blocking mechanism comprises a blocking device which is moveable between a release position and a blocking position relative to the frame and which is arrested in the blocking position by the extended foot part.

4. Mobile working machine according to claim 3, wherein the blocking mechanism comprises an at least partially flexible tension member having first and second ends and anchored at one end to the blocking device and connected at its other end to either the frame or to a frame supporting part of the wheel spring, wherein in the former case the tension member after leaving the blocking device is guided under spring-tension through a redirection guide connected to the wheel spring and continues on to a frame-fixed anchoring position, and in the latter case the tension member after leaving the blocking device is guided through a frame-fixed redirection guide prior to anchoring to an anchoring position associated with the wheel spring, such that when said blocking device is in the blocking position the tension member limits the spring path of the pretensioned wheel spring and when said blocking device is in the release position the tension member permits free play in the spring path of the wheel spring.

5. Mobile working machine according to claim 4, wherein the tension member after leaving the blocking device is guided under spring-tension through a redirection guide connected to the wheel spring and continues on to a frame-fixed anchoring position.

6. Mobile working machine according to claim 4, wherein the tension member after leaving the blocking device is guided through a frame-fixed redirection guide prior to anchoring to an anchoring position associated with the wheel spring.

7. Mobile working machine according to claim 5, wherein the tension member is guided through at least one frame-fixed redirection guide.

8. Mobile working machine according to claim 4, wherein the wheel spring is a leaf spring, on which the wheel axles are secured via spring brackets including a U-clamp having a plate, and wherein at least one of a spring-fixed redirection guide and a spring fixed anchoring position of the tension member is provided on said plate.

9. Mobile working machine according to claim 4, wherein a draw spring is connected under tension to at least one point on said flexible segment of the tension member.

10. Mobile working machine according to claim 9, wherein the draw spring has first and second ends, and wherein the draw spring first end is secured on the tension member, and the draw spring second end is secured to the frame.

11. Mobile working machine according to claim 4, wherein the tension member is at least partially constructed of a material selected from the group consisting of flexible rope and chain.

12. Mobile working machine according to claim 3, wherein the blocking device is designed as a pivot lock pivotable about a point fixed relative to the frame, connected with the tension member, pivotable between a release position and a blocking position upon movement of a control surface provided on the extendable foot part.

13. Mobile working machine according to claim 12, wherein the pivot lock is pivotable in the direction of the lock position against the force of a draw spring engaging on the tension member.

14. Mobile working machine according to claim 12, wherein the control surface includes a control curve slideable against a cam provided on the pivot lock eccentrically to the pivot axis thereof during extension of said foot part and a blocking surface which blocks the pivot lock when in the locked position.

15. Mobile working machine according to claim 14, wherein the blocking surface is continuous with the control curve and wherein the cam runs upon the blocking surface when the pivot lock is in the blocking position.

16. Mobile working machine according to claim 14, wherein the blocking surface runs parallel to the direction of extension of the foot part.

17. Mobile working machine according to claim 14, wherein the cam is a roller cam.

18. Mobile working machine according to claim 12, wherein the pivot lock is pivotable 90° about a rotation axis between the release position and the blocking position.

19. Mobile working machine according to one of claim 1, wherein the wheel spring is constructed as a pneumatic spring and that the air pressure in the pneumatic spring during extension of the foot part automatically is reduced preferably to atmospheric pressure and during retraction of the foot part automatically is increased via an air pressure unit.

20. Mobile working machine according to claim 19, wherein a control valve is in communication with said air spring and with a source of compressed air and is operably associated with said foot part to provide the air spring with compressed air upon retraction of said foot part and to vent air from said air spring when said foot part is extended.

* * * * *